(12) United States Patent
    Moshfeghi

(10) Patent No.: US 9,513,375 B2
(45) Date of Patent: *Dec. 6, 2016

(54) POSITIONING SYSTEM AND METHOD USING GPS WITH WIRELESS ACCESS POINTS

(71) Applicant: IP3, SERIES 100 OF ALLIED SECURITY TRUST I, San Fransisco, CA (US)

(72) Inventor: Mehran Moshfeghi, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,722

(22) Filed: Apr. 28, 2015

(65) Prior Publication Data

US 2015/0234051 A1    Aug. 20, 2015

Related U.S. Application Data

(63) Continuation of application No. 13/471,369, filed on May 14, 2012, now abandoned, which is a continuation of application No. 11/940,219, filed on Nov. 14, 2007, now Pat. No. 8,193,978.

(51) Int. Cl.
   *G01S 19/41*   (2010.01)
   *G01S 19/07*   (2010.01)
   *G01S 19/22*   (2010.01)
   *G01S 19/46*   (2010.01)

(52) U.S. Cl.
   CPC .............. *G01S 19/41* (2013.01); *G01S 19/07* (2013.01); *G01S 19/22* (2013.01); *G01S 19/46* (2013.01)

(58) Field of Classification Search
   CPC .......... G01S 19/07; G01S 19/41; G01S 19/22; G01S 19/46
   See application file for complete search history.

(56) References Cited

U.S. PATENT DOCUMENTS

| | | |
|---|---|---|
| 5,323,322 A | 6/1994 | Mueller et al. |
| 5,796,773 A | 8/1998 | Sheynblat |
| 5,841,971 A | 11/1998 | Longginou et al. |
| 5,874,914 A | 2/1999 | Krasner |
| 5,884,220 A | 3/1999 | Farmer et al. |
| 5,999,124 A | 12/1999 | Sheynblat |
| 6,061,632 A | 5/2000 | Dreier |

(Continued)

FOREIGN PATENT DOCUMENTS

| | | |
|---|---|---|
| CA | 2150757 | 5/2003 |
| JP | 2006-112822 | 4/2006 |
| WO | WO 94/12892 | 6/1994 |

OTHER PUBLICATIONS

U.S. Appl. No. 15/095,153, filed Apr. 10, 2016, Moshfeghi, Mehran.

(Continued)

*Primary Examiner* — Cassi Galt
(74) *Attorney, Agent, or Firm* — Maldjian Law Group LLC

(57) ABSTRACT

Embodiments of an improved assisted global positioning system (GPS) method and system are described. Wireless access points send assistance data to GPS receivers that are integrated into cellular chipsets and other chipsets. The access points may also act as fixed location references for differential GPS (DGPS) mobile stations. Errors caused by multipath travel of the GPS signals are reduced by using fixed location reference receivers.

32 Claims, 8 Drawing Sheets

(56) References Cited

U.S. PATENT DOCUMENTS

| | | | |
|---|---|---|---|
| 6,131,067 A | 10/2000 | Girerd et al. | |
| 6,185,427 B1 | 2/2001 | Krasner et al. | |
| 6,204,808 B1 | 3/2001 | Bloebaum et al. | |
| 6,215,441 B1 | 4/2001 | Moeglein et al. | |
| 6,249,245 B1 | 6/2001 | Watters et al. | |
| 6,323,803 B1 | 11/2001 | Jolley et al. | |
| 6,323,806 B1 | 11/2001 | Greving | |
| 6,531,981 B1 | 3/2003 | Fuller et al. | |
| 6,657,586 B2 | 12/2003 | Turner | |
| 6,693,592 B2 | 2/2004 | Dowdle et al. | |
| 6,700,533 B1 | 3/2004 | Werb et al. | |
| 6,853,847 B2 | 2/2005 | Shioda et al. | |
| 6,920,330 B2 | 7/2005 | Caronni et al. | |
| 7,130,646 B2 | 10/2006 | Wang | |
| 7,433,694 B2 | 10/2008 | Morgan et al. | |
| 7,755,541 B2 | 7/2010 | Wisherd et al. | |
| 7,848,765 B2 | 12/2010 | Phillips et al. | |
| 8,193,978 B2 | 6/2012 | Moshfeghi | |
| 8,294,554 B2 | 10/2012 | Shoarinejad et al. | |
| 8,570,216 B2 | 10/2013 | Gutt et al. | |
| 8,831,633 B2 | 9/2014 | Moshfeghi | |
| 8,838,135 B2 | 9/2014 | Moshfeghi | |
| 8,838,477 B2 | 9/2014 | Moshfeghi | |
| 8,838,481 B2 | 9/2014 | Moshfeghi | |
| 9,332,394 B2 | 5/2016 | Moshfeghi | |
| 9,338,606 B2 | 5/2016 | Moshfeghi | |
| 2004/0008138 A1* | 1/2004 | Hockley, Jr. | G01S 5/0072 342/357.48 |
| 2004/0218895 A1 | 11/2004 | Samadani et al. | |
| 2005/0030160 A1 | 2/2005 | Goren et al. | |
| 2005/0088284 A1 | 4/2005 | Zai et al. | |
| 2005/0124355 A1 | 6/2005 | Cromer et al. | |
| 2005/0190789 A1 | 9/2005 | Salkini et al. | |
| 2005/0195777 A1 | 9/2005 | Green | |
| 2005/0198228 A1 | 9/2005 | Bajwa et al. | |
| 2005/0242188 A1 | 11/2005 | Vesuna | |
| 2005/0281363 A1 | 12/2005 | Qi et al. | |
| 2006/0044161 A1 | 3/2006 | Feldman et al. | |
| 2007/0103303 A1 | 5/2007 | Shoarinejad | |
| 2007/0216540 A1 | 9/2007 | Riley et al. | |
| 2007/0252758 A1 | 11/2007 | Loomis | |
| 2007/0279281 A1 | 12/2007 | Oda et al. | |
| 2008/0108371 A1 | 5/2008 | Alizadeh-Shabdiz et al. | |
| 2008/0284646 A1 | 11/2008 | Walley et al. | |
| 2009/0175189 A1 | 7/2009 | Alizadeh-Shabdiz et al. | |
| 2009/0182630 A1 | 7/2009 | Otto et al. | |
| 2009/0214039 A1 | 8/2009 | Chen et al. | |
| 2011/0131104 A1 | 6/2011 | Rose et al. | |
| 2011/0196925 A1 | 8/2011 | Hans et al. | |
| 2011/0207405 A1 | 8/2011 | Minemura et al. | |
| 2011/0251892 A1 | 10/2011 | Laracey | |
| 2012/0072350 A1 | 3/2012 | Goldthwaite et al. | |
| 2012/0089469 A1 | 4/2012 | Bonalle et al. | |
| 2012/0124346 A1 | 5/2012 | Hardage et al. | |
| 2012/0209657 A1 | 8/2012 | Connolly | |
| 2012/0246079 A1 | 9/2012 | Wilson et al. | |
| 2012/0253913 A1 | 10/2012 | Richard | |
| 2012/0280859 A1 | 11/2012 | Moshfeghi | |
| 2012/0303425 A1 | 11/2012 | Katzin et al. | |
| 2012/0323777 A1 | 12/2012 | Liberty | |
| 2012/0330763 A1 | 12/2012 | Gangi | |
| 2015/0051993 A1 | 2/2015 | Moshfeghi | |
| 2015/0058125 A1 | 2/2015 | Moshfeghi | |

OTHER PUBLICATIONS

U.S. Appl. No. 15/130,225, filed Apr. 15, 2015, Moshfeghi, Mehran.

Portions of prosecution history of U.S. Appl. No. 11/940,219, Apr. 17, 2012, Moshfeghi, Mehran.

Portions of prosecution history of U.S. Appl. No. 13/422,795, Aug. 19, 2014, Moshfeghi, Mehran.

Portions of prosecution history of U.S. Appl. No. 13/422,823, Aug. 18, 2014, Moshfeghi, Mehran.

Portions of prosecution history of U.S. Appl. No. 13/465,795, Jan. 26, 2015, Moshfeghi, Mehran.

Portions of prosecution history of U.S. Appl. No. 13/471,369, Nov. 28, 2014, Moshfeghi, Mehran.

Portions of prosecution history of U.S. Appl. No. 13/556,792, Aug. 18, 2014, Moshfeghi, Mehran.

Portions of prosecution history of U.S. Appl. No. 13/556,809, May 2, 2014 Moshfeghi, Mehran.

Portions of prosecution history of U.S. Appl. No. 14/479,238, Apr. 7, 2016, Moshfeghi, Mehran.

Portions of prosecution history of U.S. Appl. No. 14/480,583, Apr. 13, 2016, Moshfeghi, Mehran.

Portions of prosecution history of U.S. Appl. No. 14/481,346, Jun. 12, 2015, Moshfeghi, Mehran.

Portions of prosecution history of U.S. Appl. No. 15/095,153, Jun. 27, 2016, Moshfeghi, Mehran.

Author Unknown, "Cisco Application-Oriented Networking Facilitates Intelligent Radio Frequency Identification Processing at the Edge," Month Unknown, 2005, pp. 1-9, Cisco Systems.

Author Unknown, "ConnecTerra Product Family," www.connecterra.com, Month Unknown, 2005, pp. 1-2, Connecterra.

Author Unknown, "Delivering an Intelligent Foundation for RFID: Maximizing Network Efficiency With Cisco RFID Solutions," Month Unknown, 2005, pp. 1-6, Cisco Systems.

Author Unknown, "Establishing the Foundation for Enterprise-Scale RFID Deployments," www.connecterra.com/products/rftagaware.php, Sep. 2004, pp. 1-2, ConnecTerra.

Author Unknown, "Four Challenges," Month Unknown, 2004, pp. 1-7, ConnecTerra.

Author Unknown, "Installation Manual R500HA Long Range RFID Reader," www.iautomate.com, Month Unknown, 2005, pp. 1-40, iAutomate.

Author Unknown, "RFTagAware™ Enterprise Server, Centralized EPC Data Management and Reporting for Enterprise-Scale RFID Deployments", www.connecterra.com, Month Unknown, 2005, 2 pages, Connecterra, Cambridge, MA.

Author Unknown, "The Sun Global RFID Network Vision: Connecting Businesses at the Edge of the Network," A Technical White Paper, Jul. 2004, 20 pages, Sun Microsystems, Santa Clara, CA.

Chun, Sebum, et al., "Performance Analysis of GPS Integer Ambiguity Resolution Using External Aiding Information," Journal of Global Positioning Systems, Month Unknown, 2005, vol. 4, No. 1-2, pp. 201-206.

Clark, Sean, et al., "Auto-ID Savant Specification 1.0", Sep. 2003, pp. 1-58, Auto-ID Center.

Dana, Peter H., "Global Positioning System Overview," Sep. 1994, 14 pages, www.colorado.edu/geography/gcraft/notes/gps/gps_f.html.

* cited by examiner

POSITIONING SYSTEM AND METHOD USING GPS WITH WIRELESS ACCESS POINTS

CLAIM OF BENEFIT TO PRIOR APPLICATIONS

This application is a continuation application of U.S. patent application Ser. No. 13/471,369, filed May 14, 2012, and published as U.S. Patent Publication No. 2012-0280859. U.S. patent application Ser. No. 13/471,369 is a continuation application of U.S. patent application Ser. No. 11/940,219, filed Nov. 14, 2007, and published as U.S. Patent Publication No. 2009-0121927. The contents of U.S. Patent Publication 2009-0121927 and U.S. Patent Publication 2012-0280859 are hereby incorporated by reference.

BACKGROUND

The present invention relates to assisted global positioning system (GPS) devices, and in particular, to GPS devices that include wireless communications capability.

Unless otherwise indicated herein, the approaches described in this section are not prior art to the claims in this application and are not admitted to be prior art by inclusion in this section.

Global positioning system (GPS) receivers can provide location information by communicating with satellites that orbit the earth. Such GPS information may provide positioning accuracies that are superior to alternative technologies such as cellular's cell-ID. A GPS receiver typically locates four or more satellites and calculates the distance to each satellite by timing a radio signal from each satellite to the receiver. In order to use this timing information the receiver, has to know the location of the satellites. Since the satellites travel in known orbit paths, the GPS receiver can receive and store the ephemeris and/or almanac that tells the receiver the location of the satellites at various times. Slight variations on the positions of the satellites caused by planetary gravitational pulls are also monitored by the Department of Defense and transmitted by the satellites themselves as part of their signals to the receivers.

A GPS receiver uses the distance/timing information and the location of the satellites to calculate its own position. The distance from each satellite limits the location of the GPS receiver to a sphere centered on the satellite location with a radius equal to the distance to the satellite. The intersection of the four spheres (one for each satellite) provides the location of the GPS receiver.

In order for the GPS receiver to measure the travel time between the satellite signal and the receiver, the satellite transmits a pseudo-random code pattern. The receiver also starts playing the same pattern. After the satellite signal reaches the receiver, it exhibits a delay lag compared to the receiver pattern. This delay represents the signal travel time. Both the satellite and the receiver must use the same clock time in order to measure this delay. The satellites use expensive atomic clocks, whereas the receivers use inexpensive quartz clocks that are recalibrated at frequent time intervals. The receiver looks at signals from four or more different satellites. It then draws the corresponding four or more spheres. If there is timing inaccuracy for the receiver's clock, the spheres will not intersect at a single point since they will all be offset by the same time error. The receiver can then adjust its clock until the spheres intersect at a single point, thereby synchronizing with the atomic clocks of the satellites.

GPS receivers may be categorized into two types, autonomous GPS receivers and assisted GPS (A-GPS) receivers. These types are detailed below.

Autonomous GPS receivers receive information from orbiting satellites and perform the calculations themselves in order to locate their position. The information they download from the satellites includes satellite ID, almanac, clock corrections and ephemeris. They use this information along with their measured pseudorange data to calculate position and velocity. Autonomous GPS systems, however, have relatively low sensitivity and cannot obtain positions in low signal environments. They also have large initial satellite signal acquisition times, since they need to decode the data received from the satellites.

Assisted GPS systems resolve the sensitivity and acquisition time limitations of autonomous GPS receivers by using assistance data from a networked and typically AC powered assistance server. The mobile device's assisted GPS receiver measures pseudoranges and Dopplers, and obtains assistance data from the assistance server. The assistance data from the server can include satellite ID, almanac, clock correction, ephemeris, approximate time, and approximate location.

Assisted GPS systems are categorized into two classes: mobile-based A-GPS and mobile A-GPS (i.e. mobile-assisted A-GPS). A mobile-based A-GPS receiver measures pseudoranges and Dopplers, receives the assistance data from the assistance server, and performs the position calculations itself. A mobile A-GPS receiver, on the other hand, uses the more powerful assistance server to perform some of the calculations for determining its position, thereby saving the mobile device's limited battery and CPU resources. For example, the mobile A-GPS receiver can calculate the distance to the satellites from the satellite signals and transmit these to a cell base station tower, which in turn forwards them to the assistance server that performs the position calculations. The assistance server can then send the calculated position information back to the mobile A-GPS receiver (or in the case of emergencies, to a 911 dispatcher).

The accuracy of A-GPS is limited by variations in the speed of the radio waves of the satellites as they travel through the earth's atmosphere. Differential GPS (DGPS) reduces these errors and all other common errors (e.g., satellite clock error) by using a stationary receiver with known coordinates. This receiver compares its computed position with its known position to calculate inaccuracies caused by atmospheric effects and other common errors in that area. It then broadcasts correction data to nearby DGPS receivers, making them more accurate than standard GPS receivers.

One problem in many existing GPS systems results from multipath signal interference. Multipath signal interference occurs when the GPS signals from the satellite are reflected by objects around the GPS receiver, such as buildings. In areas with many buildings, such as city centers, multipath signal interference results in significant position errors. There is a need for GPS systems that reduce multipath signal interference.

Similar problems include shadowing and fading. Shadowing can be caused by a large obstruction that is along the main signal path between the transmitter and the receiver. Shadowing can produce amplitude and phase changes on a carrier modulated transmitted signal. Fading also describes the distortion that a carrier-modulated signal undergoes as it travels from the transmitter to the receiver. Multipath propagation is one of the main causes of fading since it results in the receiver receiving and superimposing multiple copies of the transmitted signal, each traveling along different paths and experiencing different phase shifts, attenuations and delays. There is therefore a need for GPS systems that reduce shadowing and fading.

Thus, there is a need for improved GPS systems. The present invention solves these and other problems by providing methods and systems for assisted GPS devices.

SUMMARY

Embodiments of the present invention improve position determination using GPS signals. In one embodiment the present invention includes a method of position determination using GPS signals. The method includes receiving GPS information from GPS satellites and receiving assistance data from access points. The method further includes computing a combined assistance data from the assistance data. The method further includes computing a position based on the GPS information and the combined assistance data.

According to another embodiment of the present invention, a computer program may implement at least part of the method described above.

According to another embodiment of the present invention, a GPS device may implement at least part of the method described above.

According to another embodiment of the present invention, an assistance server may implement at least part of the method described above.

According to another embodiment of the present invention, a GPS-equipped mobile station has a wireless radio to determine its position by combining the information from its GPS receiver with information from other wireless positioning data. The wireless radio may implement various wireless protocols such as cellular, WLAN, Bluetooth®, RFID, UWB, ZigBee®, etc. The wireless positioning data may be obtained with triangulation schemes that use time of arrival or phase with wireless technologies such as WLAN, Bluetooth®, RFID, etc.

According to another embodiment of the present invention, by combining positional information from multiple sources the effects of shadowing, fading and multipath interference are reduced.

The following detailed description and accompanying drawings provide a better understanding of the nature and advantages of the present invention.

DETAILED DESCRIPTION

Described herein are techniques for GPS position determination. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

One of the aspects of certain embodiments of the present invention is extending DGPS so that instead of requiring separate dedicated DGPS stations, it can use existing wireless infrastructure such as wireless local area networks (WLANs), WiMax networks, Bluetooth® networks, and cellular networks. For example, instead of using a dedicated stationary receiver with known coordinates, certain embodiments of the present invention use existing WLAN access points since they too have fixed known coordinates. Wireless access points can also perform some of the functionality of an assistance server for A-GPS receivers, such as providing assistance data and performing position calculations. It should be noted that DGPS can also be viewed as a form of assisted GPS where the assistance data includes amongst other things range error corrections.

The deployment of wireless access points in towns and cities is increasing. These access points may be WLAN, WiMax, as well as other wireless technologies, and may be equipped with GPS devices. Such access points may have assistance servers running on them (or can communicate with networked assistance servers) that download information from orbiting satellites and provide assistance data to A-GPS receivers The information flow for both mobile-based and mobile A-GPS using access points is detailed below. In the case of mobile-based A-GPS, the access points improve the start-up times of A-GPS receivers as well as DGPS receivers by sending information (satellite ID, almanac, clock correction, ephemeris, timing information, approximate location, and Doppler) to the receivers. In the case of mobile A-GPS, the access points can offload limited resource mobile A-GPS receivers by performing some of the position calculations or by forwarding the data onto the network for another networked assistance server to perform some of the calculations.

Figure 1:
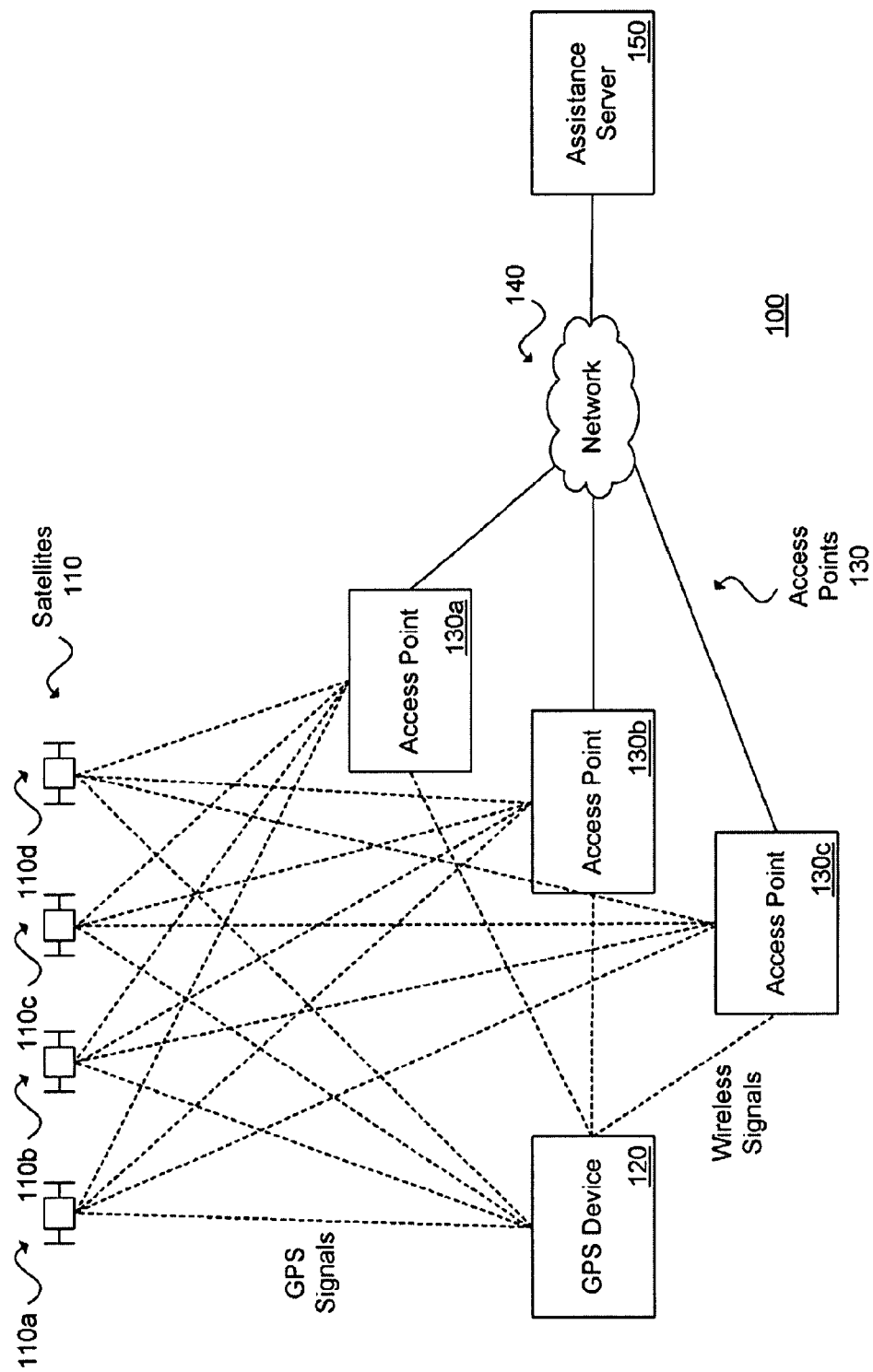
FIG. 1 is a block diagram of an assisted GPS system according to an embodiment of the present invention.

FIG. 1 is a block diagram of an assisted GPS system 100 according to an embodiment of the present invention. The assisted GPS system 100 includes a number of GPS satellites 110a, 110b, 110c and 110d (collectively 110), a GPS device 120, a number of access points 130a, 130b and 130c (collectively 130), a network 140, and an assistance server 150. The GPS satellites 110 are satellites that transmit GPS information.

The GPS device 120 may be a mobile device that receives the GPS information. The GPS device 120 may be a standalone device, or it may be part of another device such as a cellular telephone, vehicle navigation system, etc. The GPS device 120 also exchanges information with the access points 130.

The access points 130 may be access points for WLAN, WiMax, Bluetooth® or cellular systems. The access points 130 interface the GPS device 120 with the network 140. For example, if the access point 130*a* is a WLAN access point and the GPS device 120 includes a WLAN connection, the GPS device has access to the network 140 using its WLAN connection via the access point 130*a*. The access points 130 are generally located at fixed locations. In addition, the access points 130 receive the GPS information from the satellites 110, generate differential GPS information, and transmit the differential GPS information to the GPS device 120.

The network 140 may be a computer network, a telephone network, etc. The network 140 connects the access points 130 with other devices or networks. According to one embodiment, the network 140 connects to the internet.

The assistance server 150 is a device that performs assisted GPS functionality. The assistance server 150 is optional in the assisted GPS system 100. If the GPS device 120 performs all its GPS position calculations itself, it has no need for an assistance server. The assistance server 150 may be a component of, or be co-located with, one of the access points 130. Alternatively, one of the access points 130 may be a component of the assistance server 150.

Figure 2:
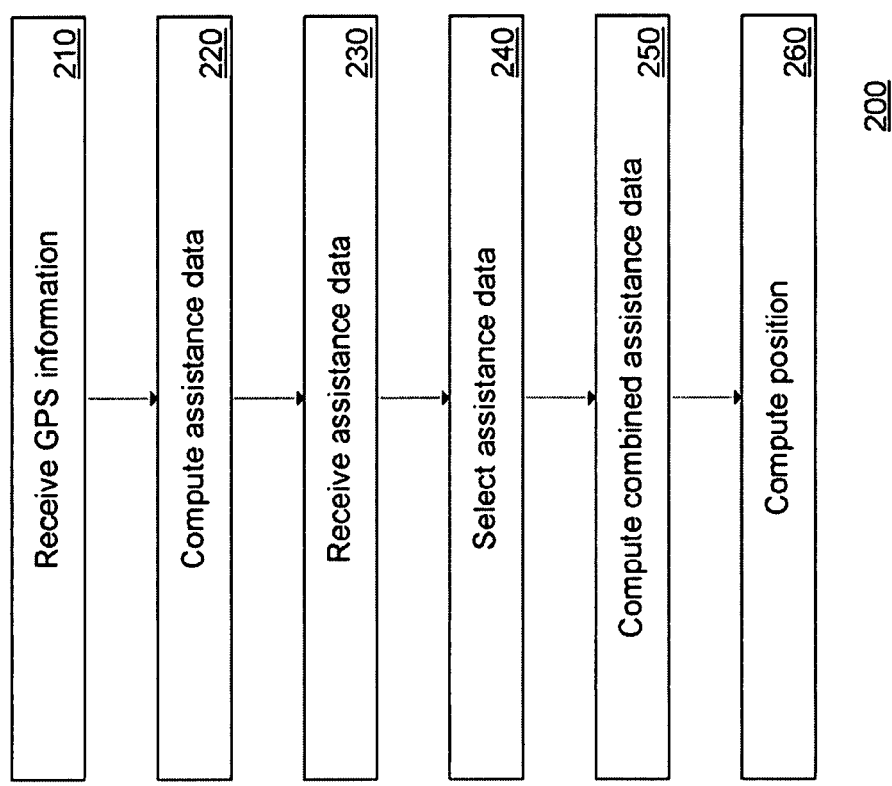
FIG. 2 is a flowchart of a method of position determination using GPS signals according to an embodiment of the present invention.

FIG. 2 is a flowchart of a method 200 of position determination using GPS signals according to an embodiment of the present invention. The method 200 may be performed by the GPS system 100 (see FIG. 1). At least parts of the method 200 may be implemented as a computer program.

In step 210, the GPS information is received. For example, in the GPS system 100, the GPS satellites 110 transmit the GPS information. The GPS device 120 and the access points 130 receive the GPS information.

In step 220, the assistance data is computed. For example, in the GPS system 100, each of the access points 130 computes assistance data based on a comparison between its position calculated from the GPS information and its known position. Since the access points 130 may be installed at fixed locations, the difference between their known position and the calculated GPS position gives an indication of the range errors to be included as differential GPS information as the assistance data.

In step 230, the assistance data is received. For example, in the GPS system 100, the GPS device 120 receives the assistance data from the access points 130. The GPS device 120 may transmit a request for the assistance data, or it may receive assistance data that is broadcast by each of the access points 130. The GPS device 120 may receive assistance data from two or more of the access points 130, with others of the access points 130 being out of range.

In step 240, the assistance data is selected. Some or all of the assistance data received in step 230 may be selected for further processing. The selection may be based on a threshold criterion. The threshold criterion may be based on a physical characteristic of the received signal containing the assistance data, such as power level or phase differential.

For example, in the GPS system 100, the GPS device 120 may perform the selection of the assistance data. Assume the GPS device 120 receives assistance data from the access point 130*a* at a relative power level of 1.0, assistance data from the access point. 130*b* at a relative power level of 0.9, and assistance data from the access point 130*c* at a relative power level of 0.5. Further assume that the selection threshold is 0.6. In such a case, the GPS device 120 may select the assistance data from the access points 130*a* and 130*b* (and exclude the assistance data from the access point 130*c* from the selection). The threshold criterion may also be based on other information known to the access points 130. For example, if the access point 130*a* knows it is surrounded by buildings and is thus susceptible to multipath interference, the access point 130*a* may supply this information to the GPS device 120 as part of the assistance data. The GPS device may then apply this information, for example as an adjustment factor, to the threshold information.

As another example, instead of the GPS device 120 performing the selection, the assistance server 150 may perform the selection. The GPS device 120 may send the assistance data and the threshold information to the assistance server 150 as part of a request to perform assistance processing. The assistance server 150 then performs the selection as described above and may send the selected assistance data to the GPS device 120. The assistance server 150 can use additional information in performing the selection. This additional information may be based on additional physical attributes of the access points 130 known to the assistance server 150 (or provided to the assistance server 150 by the access points 130). For example, the assistance server 150 may know that the access point 130*a* is surrounded by buildings and is thus susceptible to multipath interference. In such a case, the assistance server 150 may apply an adjustment factor to the threshold information. As a result, the assistance data from the access point 130*a* may not be included in the selection.

In step 250, the combined assistance data is computed from the selected assistance data. There are a number of ways to compute the combined assistance data. One way is to compute an average of the selected assistance data.

Another way is to compute a weighted average of the selected assistance data. There are various ways to assign weights to the assistance data. One way to assign weights is based on the relative distance between the devices exchanging the assistance data, where closer devices receive more weight. The relative distance may be determined based on a physical characteristic of a received signal (such as the signal containing the assistance data), such as the power level or phase differential. For example, to determine the phase differential, the phase of the received signal may be compared to the phase of a pilot signal. The phase differential is then indicative of the distance between devices.

An example of a weighted average of assisted data based on distance is as follows. Consider the case where there are four access points: $AP_1$, $AP_2$, $AP_3$, and $AP_4$ whose distances from a mobile station are $d_1$, $d_2$, $d_3$ and $d_4$, respectively. Suppose that the differential correction term provided by access points $AP_1$, $AP_2$, $AP_3$, and $AP_4$ are $X_1$, $X_2$, $X_3$ and $X_4$, respectively. Then the distance-based weighted average differential correction term X is:

$$X = \frac{(\alpha_1 X_1 + \alpha_2 X_2 + \alpha_3 X_3 + \alpha_4 X_4)}{(\alpha_1 + \alpha_2 + \alpha_3 + \alpha_4)}$$

Where $\alpha_1$, $\alpha_2$, $\alpha_3$, and $\alpha_4$ are the normalized weights for $AP_1$, $AP_2$, $AP_3$, and $AP_4$ respectively and are as follows:

$$\alpha_1 = 1, \alpha_2 = \frac{d_1}{d_2}, \alpha_3 = \frac{d_1}{d_3} \text{ and } \alpha_4 = \frac{d_1}{d_4}$$

The distances can be calculated from signal power or phase measurements.

The assigned weight may be linear, inverse linear, square, inverse square, a combination thereof, etc., depending upon the physical attributes of the received signal.

For example, in the GPS system 100, the GPS device 120 may compute the combined assistance data. The GPS device 120 may apply a weight to the selected assistance data based on the physical characteristics of the signals received from the corresponding access points 130.

As another example, instead of the GPS device 120 performing the computation, the assistance server 150 may perform the computation. If the assistance server 150 did not select the assistance data, the GPS device 120 may send the selected assistance data to the assistance server 150 as part of a request to perform assistance processing. The GPS device 120 may also send to the assistance server 150 physical information about the signals received from the corresponding access points 130 so that the assistance server 150 may determine the weights, or the GPS device 120 may determine the weights itself and send the determined weight information (instead of the raw physical information) to the assistance server 150. The assistance server 150 then performs the computation as described above and may send the combined assistance data to the GPS device 120.

In step 260, the position is computed using the GPS information and the combined assistance data. For example, in the GPS system 100, the GPS device 120 may compute its position using the GPS information it has received from the satellites 110 and the combined assistance data. The GPS device 120 may then display the position information, provide it to a 911 service provider, etc.

As another example, instead of the GPS device 120 computing the position, the assistance server 150 may compute the position of the GPS device 120. The GPS device 120 may send the GPS information to the assistance server 150 as part of a request to perform assistance processing. The GPS device 120 may also send the combined assistance data if the assistance server 150 does not otherwise have it. The assistance server 150 then computes the position of the GPS device using the GPS information and the combined assistance data, and may transmit the position information to the GPS device 120. The assistance server 150 may also provide the position information to other entities (for example, 911 service providers) as desired.

Figure 3:
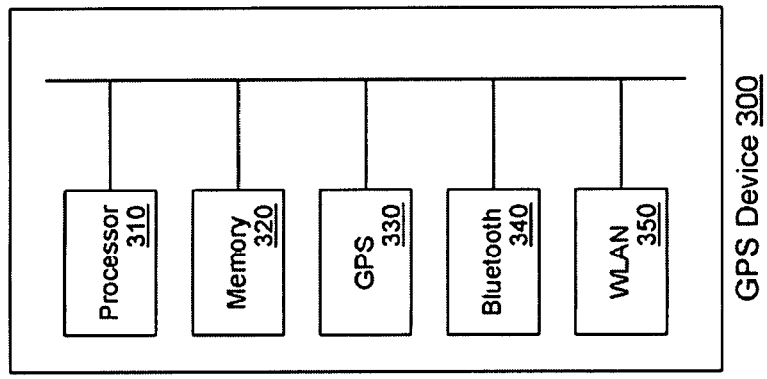
FIG. 3 is a block diagram of a GPS device according to an embodiment of the present invention.

FIG. 3 is a block diagram of a GPS device 300 according to an embodiment of the present invention. The GPS device 300 may be referred to as the mobile device and may be similar to the GPS device 120 (see FIG. 1). The GPS device 300 includes a processor 310, a memory 320, a GPS module 330, a Bluetooth® module 340, and a WLAN module 350.

The processor 310 generally controls the operation of the GPS device 300. The processor 310 may execute a computer program that implements at least part of the method 200.

The memory 320 generally stores various information used by the GPS device 300. Such information may include a computer program that implements at least part of the method 200.

The GPS module 330 generally receives GPS signals and processes the UPS signals to determine the position of the GPS device 300. The GPS module 330 may include assisted GPS functionality as described above.

The Bluetooth® module 340 communicates with an access point via the Bluetooth® protocol. According to other embodiments, the Bluetooth® module 340 may be replaced with another type of communications device, such as a WLAN module, a WiMax module or a cellular module.

The WLAN module 350 communicates with an access point via the WLAN protocol. According to other embodiments, the WLAN module 350 may be replaced with another type of communications device, such as a Bluetooth® module, a WiMax module or a cellular module. The GPS device 300 may only include one type of communications module, in which case the WLAN module 350 is an optional component.

The digital interface between the GPS module 330 and the WLAN module 350 or Bluetooth® module 340 in the GPS device 300 may be USB, UART, SPI, or I2C.

Figure 4:
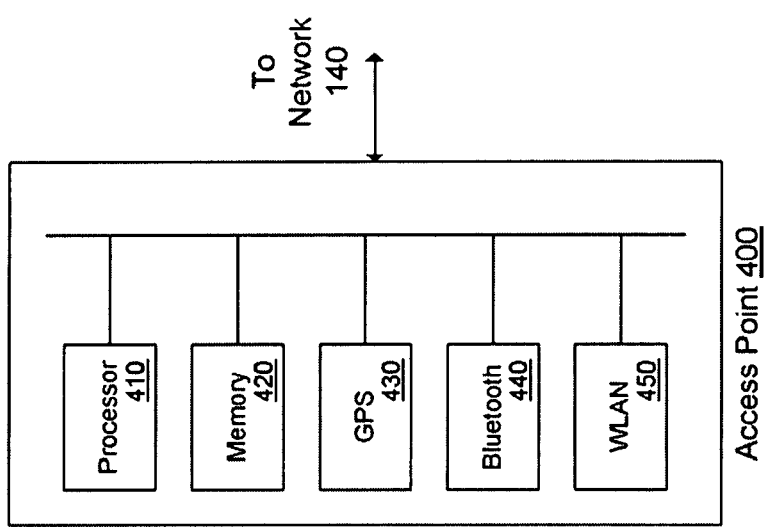
FIG. 4 is a block diagram of an access point according to an embodiment of the present invention.

FIG. 4 is a block diagram of an access point 400 according to an embodiment of the present invention. The access point 400 may be referred to as the base station and may be similar to one of the access points 130 (see FIG. 1). The access point 400 includes a processor 410, a memory 420, a GPS module 430, a Bluetooth® module 440, and a WLAN module 450.

The processor 410 generally controls the operation of the access point 400. The processor 410 may execute a computer program that implements at least part of the method 200.

The memory 420 generally stores various information used by the access point 400. Such information may include a computer program that implements at least part of the method 200.

The GPS module 430 generally receives GPS signals and processes the GPS signals to determine the position of the access point 400. The GPS module 430 may include assisted GPS functionality as described above.

The Bluetooth® module 440 communicates with a mobile device via the Bluetooth® protocol. According to other embodiments, the Bluetooth® module 440 may be replaced with another type of communications device, such as a WLAN module, a WiMax module or a cellular module.

The WLAN module 450 communicates with a mobile device via the WLAN protocol. According to other embodiments, the WLAN module 450 may be replaced with another type of communications device, such as a Bluetooth® module, a WiMax module or a cellular module. The access point 400 may only include one type of communications module, in which case the WLAN module 450 is an optional component.

The digital interface between the GPS module 430 and the WLAN module 450 or Bluetooth® module 440 in the access point 400 may be USB, UART, SPI, or I2C.

Figure 5:
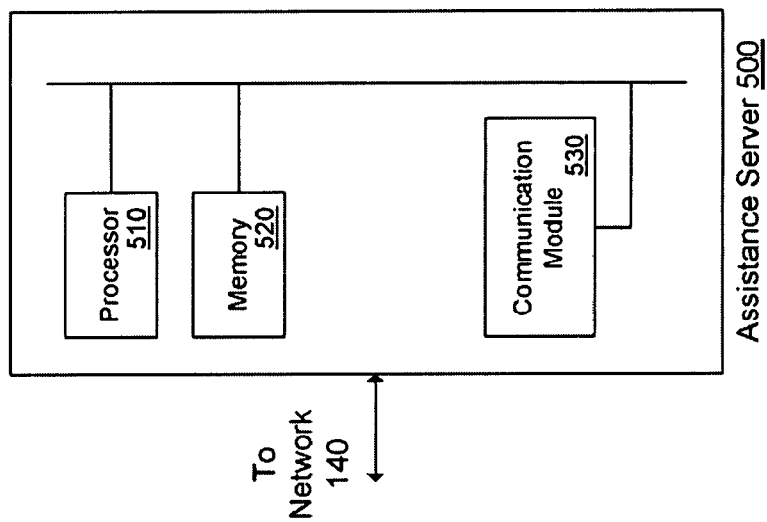
FIG. 5 is a block diagram of an assistance server according to an embodiment of the present invention.

FIG. 5 is a block diagram of an assistance server 500 according to an embodiment of the present invention. The assistance server 500 may be similar to the assistance server 150 (sec FIG. 1). The assistance server 500 includes a processor 510, a memory 520, and a communications module 530.

The processor 510 generally controls the operation of the assistance server 500, The processor 510 may execute a computer program that implements at least part of the method 200.

The memory 520 generally stores various information used by the assistance server 500. Such information may include a computer program that implements at least part of the method 200.

The communications module 530 generally links the assistance server 500 with the network 140.

More details of embodiments of the present invention are provided below.

As discussed above regarding the method 200, there are various options for embodiments of the GPS device 120 and the assistance server 150. According to one embodiment, the GPS device 120 combines the assistance data and computes its position using the GPS information and the combined assistance data. According to another embodiment, the assistance server 150 combines the assistance data, and GPS device 120 computes its position using the GPS information and the combined assistance data. According to another embodiment, the GPS device 120 combines the assistance data, and the assistance server 150 computes the position of the GPS device 120 using the GPS information and the combined assistance data. According to another embodiment, the assistance server 150 combines the assistance data and computes the position of the GPS device 120 using the GPS information and the combined assistance data. (Note that in the above descriptions of the embodiments, the details of the information transferred between the GPS device 120 and the assistance server 150 are omitted.)

Because the locations of wireless access points are fixed, they may also be used as reference receivers for DGPS receivers. For example, the GPS receiver of an access point may receive signals from all the satellites in its view and then compute its position. It may then compare its computed position with its known coordinates in order to calculate range errors (caused by atmospheric effects, satellite clock errors, etc) for each satellite. The access point may then send (with wireless and wired networking) correction data to nearby DGPS receivers to make them more accurate. This transmission may be broadcast at regular time intervals or whenever a DGPS receiver requests assistance data. The DGPS receivers may use the correction data to correct the satellite signals they are receiving in order to get more accurate position information. The access points may re-compute and re-broadcast the correction data at regular intervals in order to correct for changing atmospheric conditions. The closer a DGPS mobile station is to a reference access point, the more accurate its computed position may be. A DGPS mobile station may use the correction data from more than one access point to improve its accuracy even further.

DGPS systems may be categorized into two classes: mobile-based DGPS and mobile DGPS. If the DGPS receiver has limited processing or battery power, then mobile DGPS may be used where the DGPS receiver communicates with a more powerful networked assistance server and shares the tasks required to use correction data to calculate positions. For example, the DGPS receiver may calculate the distances to the satellites from the four satellite signals and may transmit these together with the correction data to a WLAN access point or cellular base station tower, which in turn forwards them to an assistance server that performs the position calculations. The assistance server can then use the network to send the calculated position back to the DGPS receiver or in the case of emergencies to a 911 dispatcher. The assistance server may or may not physically reside on the access points. The functionality of the assistance server may be physically inside the WLAN/WiMax access points or cellular base-station towers. Alternatively, if the mobile station has the computing power, it can perform the calculations itself as a mobile-based DGPS system.

The GPS receivers may be integrated into cellular chipsets such as CDMA and UMTS/GPS, as well as other wireless standards such as WLAN, Bluetooth®, UWB or combinations of them. The wireless access point has stored its absolute position information in its memory. It also may store any assistance data that it receives from satellites in its memory.

The GPS-equipped mobile station may also use wireless power control techniques to conserve its battery energy. For example, Bluetooth® communication has a shorter range than WLAN, but consumes significantly less power. Thus, a mobile-station that needs to conserve battery power may communicate with a nearby access point using its Bluetooth® module rather than WLAN (the base-station is also equipped with a Bluetooth® module). It may also use the transmit power control option of the 802.11 WLAN standard for conserving power in the uplink transmissions (from the mobile to the access point). Transmit power control within 802.11 allows the device to use the best transmission power level out of several available power levels.

After computing or receiving (from an assistance server) latitude, longitude and altitude positions, the mobile-based A-GPS receivers, mobile A-GPS receivers, mobile-based DGPS receivers or mobile DGPS receivers may superimpose their location onto maps that are stored in their memory. This improves the user interface for navigation by the user.

A GPS-equipped mobile station may switch between mobile-based A-GPS and mobile A-GPS configurations. Likewise, a DGPS-equipped mobile station may switch between mobile-based DGPS and mobile DGPS configurations. For example, a mobile-based A-GPS receiver that becomes resource-limited (CPU cycles, battery energy, etc.) may become mobile A-GPS and transfer its data to an assistance server for processing. The reverse is also true where a mobile A-GPS receiver that gains additional resource capacity (e.g., CPU availability) switches to a mobile-based A-GPS receiver and performs the position calculations itself.

In another embodiment, if the connection to an access point falls below a certain threshold or is lost altogether, then the mobile-station may switch to other reference access points. For example, it can switch from one WLAN access point to another WLAN access point, or it can handover from a WLAN access point to a WiMax access point or cellular base-station tower. This switching may be implemented using access point handover algorithms. In another approach, the mobile station may also use assistance data or reference correction data (for DGPS) from different access points that are nearby (WLAN, WiMax, cellular) in order to improve accuracy.

Besides the options for assigning weights to the assistance data as described above regarding step 250, another way to assign weights is by communications protocol. If the mobile device includes two types of communications modules, with one having a shorter range than the other, a higher weight may be assigned to the assistance data received via the shorter range protocol. For example, for the GPS device 300, the Bluetooth® module 340 has a shorter range than the WLAN module 350. The weight assigned to assistance data received via the Bluetooth® module 340 may be assigned a higher weight than that received via the WLAN module 350. In essence the weights are assigned based on physical attributes of the received signal (such as received power), which in turn can be related to the type of protocol used. For example, some protocols such as Bluetooth are typically for shorter range communication and hence can result in stronger received signal power than signals that travel longer distances, such as cellular signals.

Another source of error in DGPS systems is reflections of the satellite transmitted signals. These reflections or multipath interference cause delays that get translated into range errors when they are multiplied by the speed of light. Another aspect of certain embodiments of the present invention is to reduce the errors caused by multipath travel by using several nearby fixed location reference receivers. These reference receivers may be selected either by the GPS receiver itself or by the assistance server. The selection can be based on certain criteria such as received signal strength by the GPS receiver or the relative geometry of the reference receivers. Since different reference receivers will experience different multipath travel delay characteristics, the result of combining and optimizing the resulting calculated position coordinates or correction terms will improve accuracy of DGPS systems. This combing and optimization algorithm may be performed on a server that may or may not reside on one of the fixed location reference receivers. Yet another approach is to use a nearby access point as a reference receiver since it experiences similar multipath reflections as the DGPS mobile station. Since the location of the access point is known, it can correct for atmospheric effects, multipath errors, and other common errors.

Figure 6:
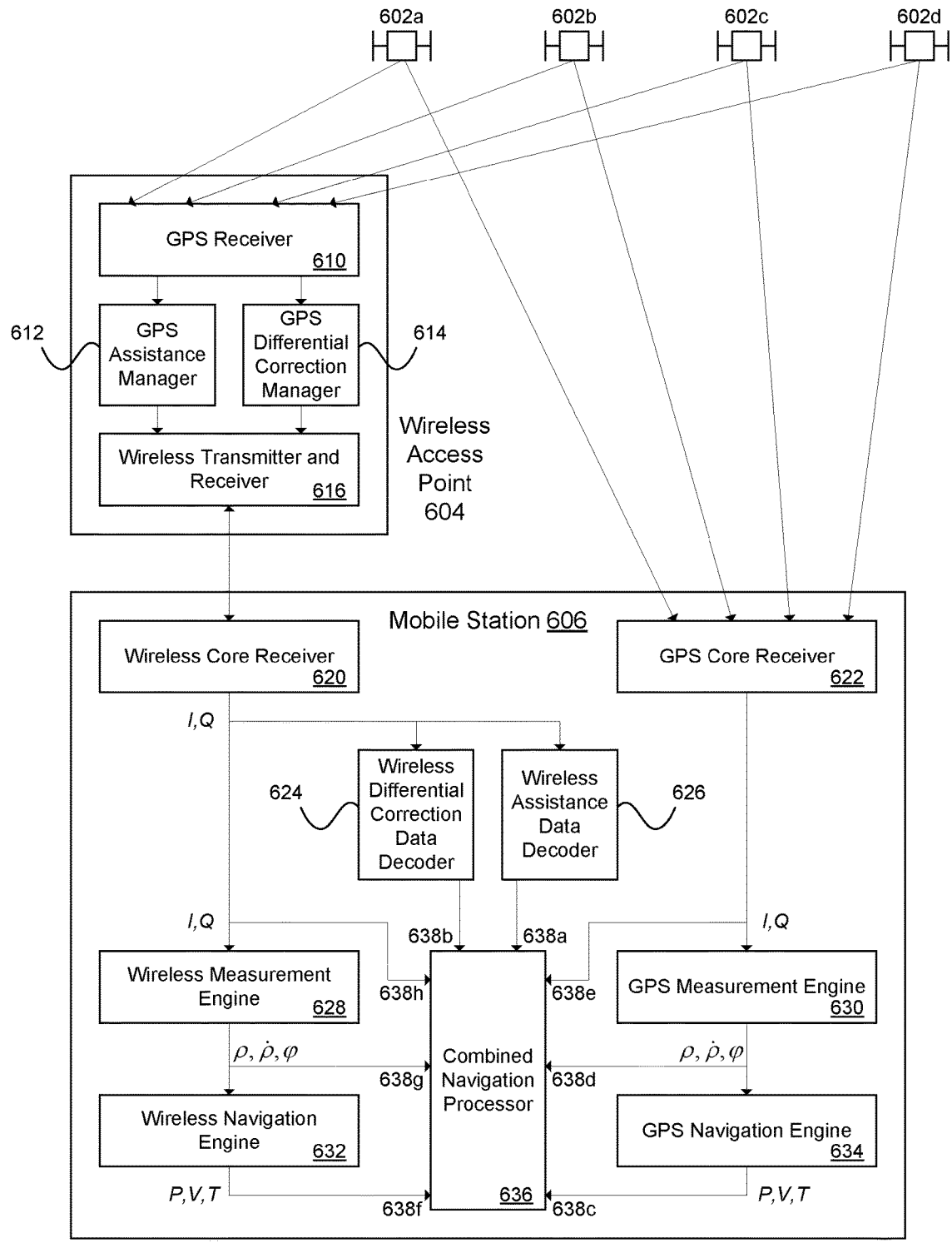
FIG. 6 is a block diagram of a combined GPS and wireless positioning system according to an embodiment of the present invention.

FIG. 6 is a block diagram of a combined GPS and wireless positioning system 600 according to an embodiment of the present invention. The system 600 includes satellites 602a, 602b, 602c and 602d (collectively satellites 602); a wireless access point 604; and a mobile station 606. In general, the GPS equipped mobile station 606 includes a wireless radio to determine its position by combining the information from its GPS receiver with information from other wireless positioning data. The wireless radio may implement various wireless protocols such as cellular, WLAN, Bluetooth®, RFID, UWB, ZigBee®, etc. The wireless positioning data may be obtained with triangulation schemes that use time of arrival or phase with wireless technologies such as WLAN, Bluetooth®, RFID, etc. By combining positional information from multiple sources the effects of shadowing, fading and multipath interference are reduced.

Wireless access points (such as the wireless access point 604) may be deployed in towns and cities. These access points may be equipped with GPS. Thus in addition to providing wireless access to the Internet or to cellular networks, they may also provide GPS assistance data via a GPS assistance manager. Since the location of these access points is usually fixed and known, they may also provide GPS differential information via a GPS differential correction manager.

The wireless access point 604 includes a GPS receiver 610, a GPS assistance manager 612, a GPS differential correction manager 614, and a wireless transmitter and receiver 616.

The mobile station 606 includes a wireless core receiver 620, a GPS core receiver 622, a wireless differential correction data decoder 624, a wireless assistance data decoder 626, a wireless measurement engine 628, a GPS measurement engine 630, a wireless navigation engine 632, a GPS navigation engine 634, and a combined navigation processor 636.

In FIG. 6 the wireless receiver in the access point 604 may be cellular, WLAN (802.11*), Bluetooth®, UWB, RFID, ZigBee®, etc. As we shall see later in FIG. 9 the mobile station may have multiple wireless radios and may combine the information from more than one type of access point.

The wireless access point 604 and components thereof may generally operate as described above regarding the access point 130 (see FIG. 1) or the access point 400 (see FIG. 4). The GPS receiver 610 receives GPS signals from the satellites 602. The GPS assistance manager 612 performs GPS assistance functions. The GPS differential correction manager performs differential GPS functions. The wireless transmitter and receiver 616 communicates with mobile stations such as the mobile station 606.

More specifically, the GPS assistance manager 612 encodes and formats the GPS assistance data based on some specific protocol such as Secure User Plane Location protocol (SUPL). Similarly, the GPS differential correction manager 614 encodes and formats the GPS differential correction data.

The GPS core receiver 622 receives the GPS RF signal from all visible satellites, down-converts the signals, correlates and dispreads the signals using the locally generated codes, and provides the baseband In-phase (I) and Quadrature (Q) symbols to the GPS measurement engine 630.

The GPS measurement engine 630 processes the I and Q symbols and to generate the GPS raw measurements such as the pseudoranges, dopplers, and integrated carrier phase ($\rho$, $\dot{\rho}$, $\phi$) for all the visible satellites. These raw measurements are then provided to the GPS navigation engine 634.

The GPS navigation engine 634 receives the GPS raw measurements and calculates position, velocity, and time (P,V,T). This may include Kalman filtering for getting better estimates.

The wireless core receiver 620 receives the wireless RF signal, down-converts, demodulates, and decodes the signal. Note that the wireless communication may be based on any standard, e.g., Bluetooth®, ZigBee®, 802.11x, etc. The wireless core receiver 620 provides the baseband I and Q symbols.

The wireless measurement engine 628 receives the I and Q symbols and generates the raw measurements for navigation. Such measurements may include pseudoranges, dopplers, and integrated carrier phases ($\rho$, $\dot{\rho}$, $\phi$) for all the wireless access points in the region.

The wireless navigation engine 632 receives the raw navigation measurements and calculates position, velocity, and time (P,V,T).

The wireless assistance data decoder 626 and the wireless differential correction data decoder 624 are the peer entities of the GPS assistance manager 612 and the GPS differential correction manager 614, respectively decoding their data.

The combined navigation processor 636 implements various signal processing and optimization algorithms in order to combine different data from the GPS receiver 622 with the data from the wireless receiver 620. Examples of such algorithms include Weighted Least Squares and Extended Kalman Filters. The actual architecture and implementation mechanism of such signal processing algorithms may depend on the type of data provided to the combined navigation processor 636. The following schemes specify the different possibilities of the data types which may be provided to this block. (Note that any combination of these integration schemes may be implemented in various embodiments of the present invention.)

Scheme 1: In this integration scheme, the wireless access point 604 provides GPS assistance data to the mobile station 606. Such assistance data may include reference time, the ID's and ephemerides of the satellites to be tracked, decoded navigation data, etc.

Scheme 2: In this scheme, wireless access point 604 has been provided with its true location and, given its own GPS measured location, can therefore calculate the measured range errors for each of the visible satellites 602. Note that the wireless access point 604 and the wireless terminal 606 are assumed to be relatively close to each other and hence they experience many common error sources, e.g., atmospheric errors. So in this integration scheme, the wireless access point 604 provides its calculated errors to the wireless terminal 606 which may then use them as differential correction terms and cancel out the common errors and achieve better accuracy.

Scheme 3: In this scheme, the final PVT solution of the GPS receiver 622 is provided to the combined navigation processor 636, which may then combine it with the different data coming from the wireless receiver 620.

Scheme 4: In this scheme, the raw GPS measurements such as pseudoranges, dopplers, and carrier phases are provided to the combined navigation processor 636.

Scheme 5: In this scheme, the combined navigation processor 636 receives the actual I and Q symbols directly from the core GPS receiver module 622. To achieve a tight form of integration, an embodiment of the present invention may combine this scheme with Scheme 8, where the I and Q data out of the core wireless receiver 620 are also provided to the combined navigation processor 636.

Scheme 6: In this scheme, the final PVT solution obtained independently by the wireless receiver 620 (e.g., through triangulation using multiple wireless access points) is provided to the combined navigation processor 636, which may then combine it with the different data coming from the GPS receiver 622.

Scheme 7: In this scheme, the raw navigation measurements such as pseudoranges, dopplers, and carrier phases, generated by the wireless receiver 620, are provided to the combined navigation processor 636.

Scheme 8: In this scheme, the combined navigation processor 636 receives the actual I and Q symbols directly from the core wireless receiver module 620.

The embodiment of FIG. 6 shows one access point 614 and one mobile station 606 combining their data. Since each can provide 3 different inputs to the combined navigation processor 636 (marked 638c, 638d, 638e and 638f, 638g, 638h) this creates 3×3=9 possible combinations. For each of these combinations there are 4 cases (assistance data, no assistance data, differential correction, and no differential correction), giving a total of 9×4=36 cases. In the general cases where there are N access points, then the combined navigation processor 636 has a total of 3×(N+1)×4×N possible combinations.

According to another embodiment, the combined navigation processor 636 may be inside the wireless access point 604 instead of the mobile station 606. In such a scenario the signal processing and optimization algorithms for combining different data from the GPS receiver 622 with the data from the wireless receiver 620 is carried out inside the access point 604. This offloads the mobile station 606 from having to perform the processing, but it does require the mobile station 606 to send its data to the access point 604 and the access point 604 to send its processing results back to the mobile station 606. For example, the processor 410 in the access point 400 (see FIG. 4) may implement the functionality of the combined navigation processor 636.

One example of the algorithm implemented by the combined navigation processor 636 unit is an extended Kalman filter (EKF). The EKF algorithm is an iterative process by which a vector of parameters is optimally estimated given a dynamical model and a set of measurements at consecutive time steps. It uses a non-linear filter function that effectively tries to combine the measurements in some optimal fashion in order to obtain the intended estimate.

Figure 7:
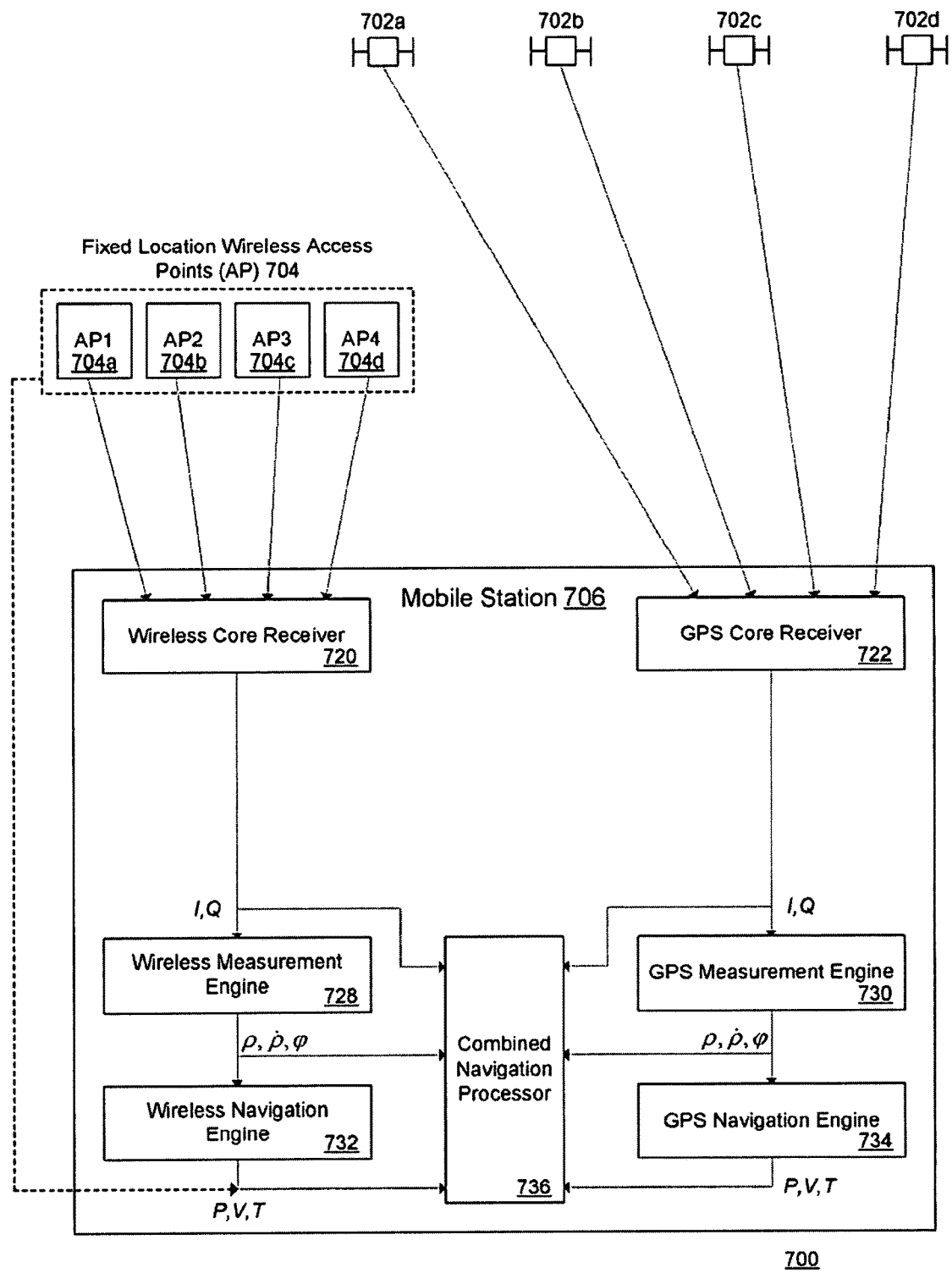
FIG. 7 is a block diagram of a combined GPS and wireless positioning system according to an embodiment of the present invention.

FIG. 7 is a block diagram of a combined GPS and wireless positioning system 700 according to an embodiment of the present invention. The system 700 includes satellites 702a, 702b, 702c and 702d (collectively satellites 702); fixed location access points 704a, 704b, 704c and 704d (collectively access points 704); and a mobile station 706. The satellites 702 and the access points 704 are similar to the satellites 602 and access point 604, for example.

The mobile station 706 includes a wireless core receiver 720, a GPS core receiver 722, a wireless measurement engine 728, a GPS measurement engine 730, a wireless navigation engine 732, a GPS navigation engine 734, and a combined navigation processor 736. These elements are similar to the elements of the system 600 (see FIG. 6) described above.

The mobile station 706 determines its position and navigation by combining the information from its GPS receiver 722 with information from triangulation schemes using the wireless access points 704 (e.g. WLAN, UWB, Bluetooth®, ZigBee®). The combined navigation processor 736 may use information from the fixed location wireless access points 704 that use triangulation schemes with time of arrival or phase. As shown in FIG. 7, four wireless access points 704 with known locations (either because they are immobile, or through GPS) are used to find range information to the mobile station 706. The position calculation can either be computed by one of the access points 704 and sent directly to the combined navigation processor 736 (see dashed line), or the measurement data can be sent by each access point 704 to the mobile station 706 for processing. The combined navigation processor 736 can then combine the triangulation data with the mobile station's GPS receiver data.

One example for combining the measurement data is the Extended Kalman Filter. The equation ($\hat{x}(t_k^+) = \hat{x}(t_k^-) + K_k[y[k] - h(\hat{x}(t_k^-), t_k)]$) discussed in more detail below shows how the measurement vector y[k] which can include all the measurements is used in the filter to update the estimate of the vector parameter of interest, x, which can include location as a parameter.

In another pending application commonly owned by the assignee of the present application is described a method of using RF signals transmitted from one or more RFID readers to measure times of arrival and locate the position of a tag using triangulation and geometric methods. See U.S. patent application Ser. No. 11/641,624, titled "RFID Location Systems and Methods", filed 18 Dec. 2006, which is incorporated herein by reference. In another pending application commonly owned by the assignee of the present application is described a method of determining a distance between an RFID reader and an RFID tag by transmitting two or more signals from the reader having two or more frequencies, measuring a phase difference between backscattered signals from the tag, and using the phase difference to determine the distance between the tag and reader. See U.S. patent application Ser. No. 11/641,623, titled "Method and System for Determining the Distance Between an RFID Reader and an RFID Tag using Phase", filed 18 Dec. 2006, which is incorporated herein by reference. The RFID readers may be fixed location pre-assigned readers or mobile readers with structure to determine their positions such as being equipped with GPS. Thus, RFID readers may be used in a similar fashion as access points to locate a mobile station that has a tag attached to it. This is illustrated in the embodiment of FIG. 8.

Figure 8:
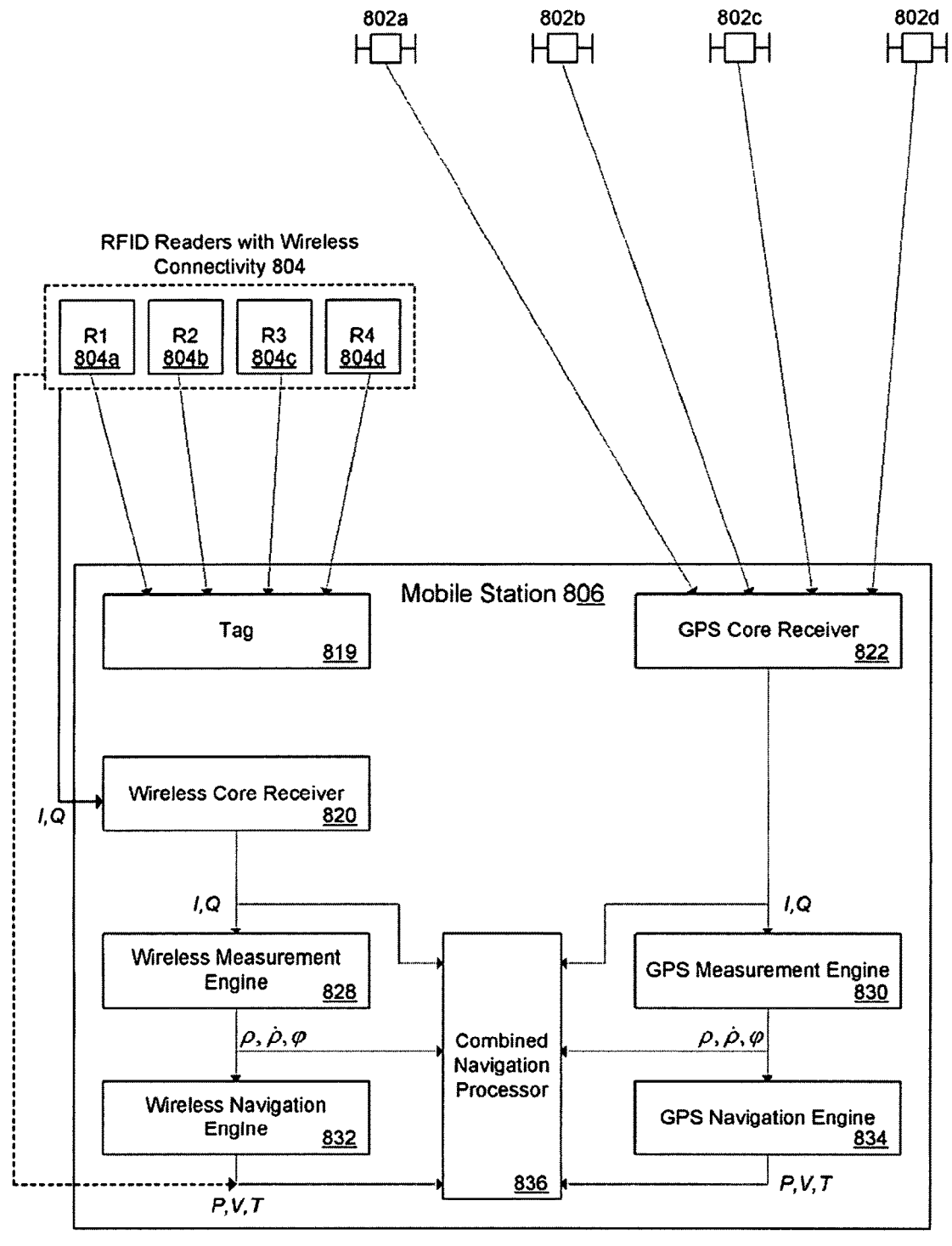
FIG. 8 is a block diagram of a combined GPS and wireless positioning system 800 according to an embodiment of the present invention.

FIG. 8 is a block diagram of a combined GPS and wireless positioning system 800 according to an embodiment of the present invention. The system 800 includes satellites 802a, 802b, 802c and 802d (collectively satellites 802); RFID readers 804a, 804b, 804c and 804d (collectively RFID readers 804); and a mobile station 806. The satellites 802 are similar to the satellites described previously. The RFID readers 804 are similar to the RFID readers described in the above two co-pending applications that have been incorporated by reference.

The mobile station 806 includes an RFID tag 819, a wireless core receiver 820, a GPS core receiver 822, a wireless measurement engine 828, a GPS measurement engine 830, a wireless navigation engine 832, a GPS navigation engine 834, and a combined navigation processor 836. These elements are similar to the elements of the system 700 (see FIG. 7) described above.

In the system 800, the tagged mobile station 806 determines its position and navigation by combining the information from its GPS receiver 822 with information from triangulation schemes using the RFID readers 804. The RFID readers 804 interrogate the tag 819 attached to the mobile station 806 and then use their wireless connectivity (e.g. WLAN, Bluetooth®) to transmit the measured data or calculated positions (see dashed line in FIG. 8). The calculation may be carried out with one of the readers. The combined navigation processor 836 may then combine this data with the data that the mobile station's GPS receiver 822 has provided.

One example for combining the GPS and RFID measurement data is again the Extended Kalman Filter. Again the equation $(\hat{x}(t_k^+) = \hat{x}(t_k^-) + K_k[y[k] - h(\hat{x}(t_k^-), t_k)])$ described in more detail below can be used where measurement vector y[k] incorporate both GPS and RFID measurement data.

Figure 9:
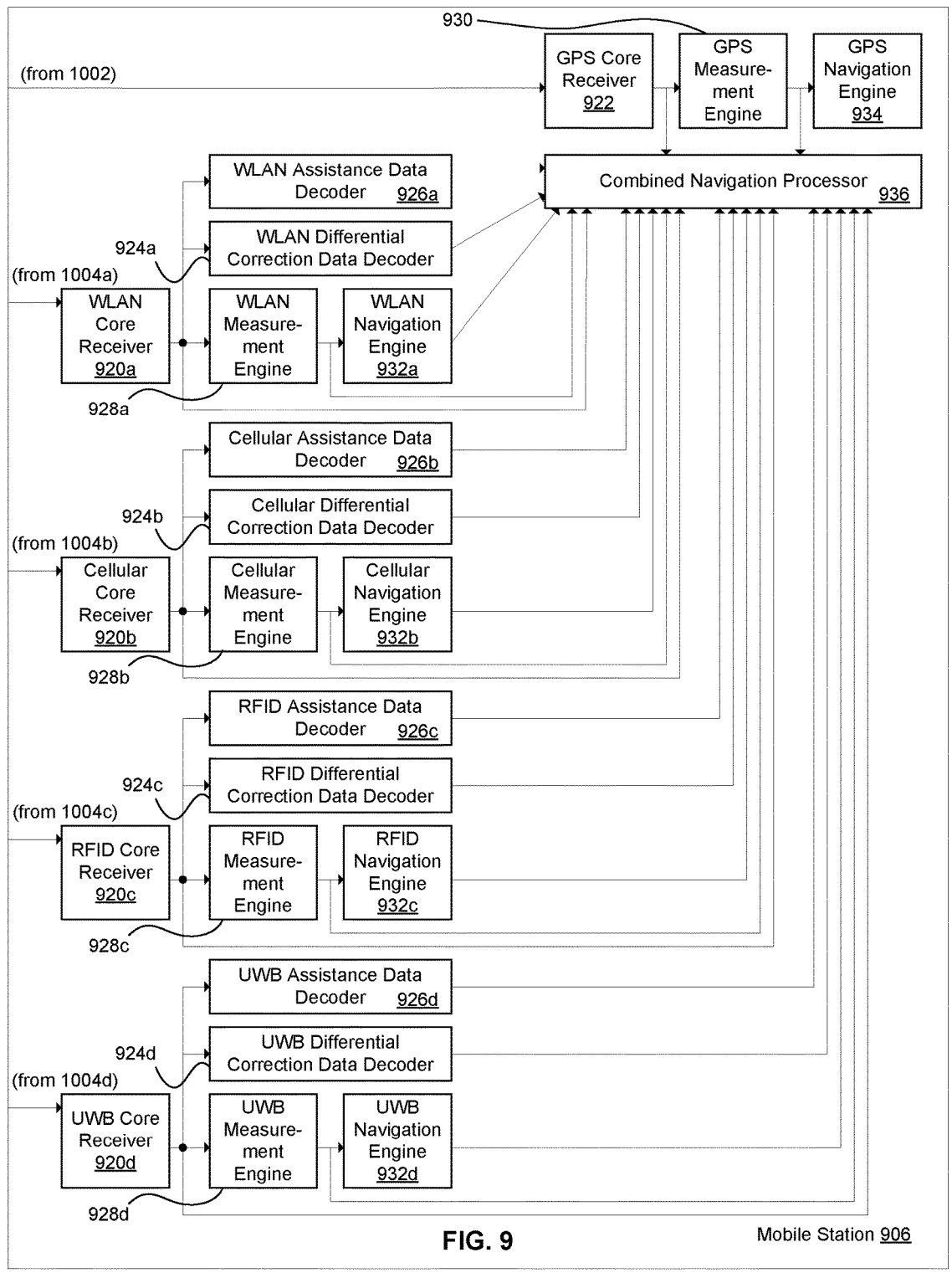
FIG. 9 is a block diagram of a mobile station according to an embodiment of the present invention.

FIG. 9 is a block diagram of a mobile station 906 according to an embodiment of the present invention. The mobile station 906 includes a WLAN core receiver 920a, a cellular core receiver 920b, a RFID core receiver 920c, and a UWB core receiver 920d (collectively receivers 920); a WLAN differential correction data decoder 924a, a cellular differential correction data decoder 924b, a RFID differential correction data decoder 924c, and a UWB differential correction data decoder 924d (collectively differential correction data decoders 924); a WLAN assistance data decoder 926a, a cellular assistance data decoder 926b, a RFID assistance data decoder 926c, and a UWB assistance data decoder 926d (collectively assistance data decoders 926); a WLAN measurement engine 928a, a cellular measurement engine 928b, a RFID measurement engine 928c, and a UWB measurement engine 928d (collectively measurement engines 928); a WLAN navigation engine 932a, a cellular navigation engine 932b, a RFID navigation engine 932c, and a UWB navigation engine 932d (collectively navigation engines 932); a GPS core receiver 922; a GPS measurement engine 930; a GPS navigation engine 934; and a combined navigation processor 936.

The mobile station 906 has multiple wireless radios 920. It can therefore communicate with different types of GPS-equipped wireless access points (see FIG. 10) and combine the information from them. The characteristics of these access points differ in terms of their signal frequency, power, signal source location, and protocol. Because of this they exhibit different shadowing, fading and multipath effects and combining their signals may reduce the errors caused by these effects. For example, signals from different locations experience different multi path errors and averaging may reduce the multipath errors. Shadowing is also location dependent so while one access point can experience shadowing others may not. The combining algorithm may use weights based on criteria such as received signal strength indicator (RSSI) or power strength, approximate location, etc. For example, at indoor locations the signals and triangulation methods of WLAN and RFID get more weight than GPS because GPS is limited indoors whereas WLAN and RFID are not. At outdoor locations, however, GPS signals may be weighted more than WLAN and RFID. Note that the access points can have GPS receivers and provide the information they receive to the combined navigation processor 936, or they could use other means such as triangulation (see the embodiment of FIG. 7 or the embodiment of FIG. 8). There may also be hybrid approaches where for example, some RFID readers or WLAN access points can have GPS receivers while others can use triangulation. Access points that have a GPS receiver have the option of providing differential correction or assistance data.

The mobile station 906 may download maps related to its position and may use information in the maps to adjust the weights it applies to the position information it receives. The maps may include interior features (for example, walls) as well as exterior features (for example, buildings or hills). For example, if the mobile station is in a position that would, based on the configuration of the surrounding buildings, be susceptible to multipath interference of GPS signals, the GPS information may receive a reduced weight by the combined navigation processor 936. The maps may be provided from a map server that may be a component of an access point or may be from a map server (for example, connected to the network 140).

The mobile station 906 may also combine assistance data and other information from access points of the same type. This is possible since the wireless communication mechanisms are packet-based and a particular receiver can switch between two access points of the same type. For example, the mobile station may combine the positioning information it is receiving from two or more UWB access points by weighting their information according to various criteria (e.g. signal or power strength, approximate location, etc.). One such criteria is that higher strength signals get larger weights than lower strength signals because they are presumed to be closer to the mobile station. This example may also be applied to other types of access points (e.g. averaging information from two or more access point of type RFID or ZigBee® or WLAN or cellular or Bluetooth®, etc.).

Figure 10:
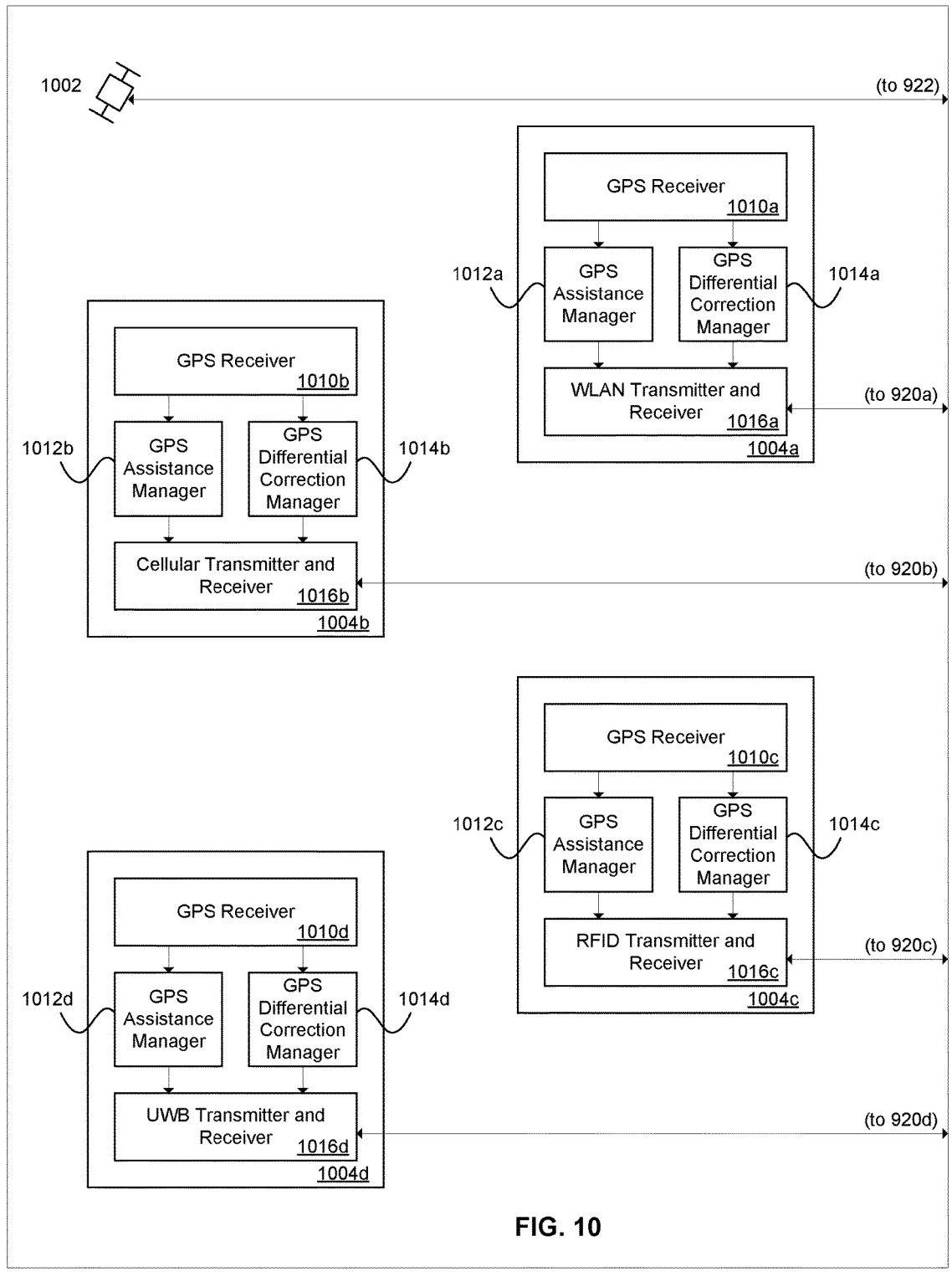
FIG. 10 is a block diagram of access points and related structure according to an embodiment of the present invention.

FIG. 10 is a block diagram of access points 1004 and related structure according to an embodiment of the present invention. (Note the connections to FIG. 9.) The WLAN access point 1004a includes a GPS receiver 1010a, a GPS assistance manager 1012a, a GPS differential correction manager 1014a, and a WLAN transmitter and receiver 1016a. The cellular tower access point 1004b includes a GPS receiver 1010b, a GPS assistance manager 1012b, a GPS differential correction manager 1014b, and a cellular transmitter and receiver 1016b. The RFID reader access point 1004c includes a GPS receiver 1010c, a GPS assistance manager 1012c, a GPS differential correction manager 1014c, and a RFID transmitter and receiver 1016c. The UWB access point 1004d includes a GPS receiver 1010d, a GPS assistance manager 1012d, a GPS differential correction manager 1014d, and a UWB transmitter and receiver 1016d. These elements are similar to the elements described above with reference to FIG. 6.

The embodiment of FIG. 10 includes separate physical access points for each mode of wireless communication (WLAN, Cellular, RFID, Bluetooth®, ZigBee®, etc.). However, some or all of their functionality may be contained in a single physical access point with only one GPS receiver. Thus, there would be fewer inputs to the combined navigation processor (see FIG. 9). The different radios of the access point, however, could still contribute to triangulation schemes.

One example for combining all the measurement data is again the Extended Kalman Filter. Again the equation $$\left(\hat{x}(t_k^+) = \hat{x}(t_k^-) + K_k\left[y[k] - h(\hat{x}(t_k^-), t_k)\right]\right)$$

discussed in more detail below can be used where measurement vector y[k] incorporate all the measurement data.

Extended Kalman Filter (EKF) Details

As described above, embodiments of the present invention may implement EKF for combining location information. The EKF consists of two distinguishable processes. One is typically called "measurement update" where the available measurement vector at a time instant is used to update the estimated vector for that time instant. The second is typically called "time update" where the estimated vector is propagated in time to the next time step where a new measurement vector will be available.

Assume the dynamics of the user device is modeled as:

$$\dot{x}(t) = f(x(t), t) + w(t)$$

where x(t) is the vector of the parameters to be estimated (e.g., position, velocity, . . . ) and w(t) is a white Gaussian noise vector with covariance matrix Q(t):

$$E[w(t)w^T(\tau)] = Q(t)\delta(t-\tau)$$

Also assume that the measurement vector y at time $t_k$ can be written as:

$$y[k] = h(x(t_k), t_k) + v[k]$$

where v[k] is the measurement noise vector with covariance matrix $R_k$. Note that the vector function "h" in the above model depends on the actual type of measurements available to the combined navigation processor (i.e., the different integration schemes described above) and how those measurements relate to the parameters that we want to estimate (e.g., position, velocity).

The EKF algorithm is one way to optimally estimate the vector x given the measurement vector y.

Assume that we have $\hat{x}(t_k^-)$ which is the a priori estimate of "x" right before time instant $t_k$. One can update the estimate of x at time $t_k$ by incorporating the available measurement vector y[k] using the following EKF equation:

$$\hat{x}(t_k^+) = \hat{x}(t_k^-) + K_k\left[y[k] - h(\hat{x}(t_k^-), t_k)\right]$$

where $K_k$ is called the measurement update gain at time $t_k$ and can be obtained as:

$$K_k = P_k^- H_k^T (H_k P_k^- H_k^T + R_k)^{-1}$$

where the matrix $H_k$ is defined as:

$$H_k := \frac{\partial h(x(t_k), t_k)}{\partial x(t_k)}\bigg|_{x(t_k) = \hat{x}(t_k^-)}$$

and the matrix $P_k^-$ is the a priori covariance matrix of the estimation error vector right before time instant $t_k$.

Now, to complete the estimation process, we need to be able to propagate both the estimated vector as well as the error covariance matrix to the next time step when the next measurement vector will be available.

First, in order to propagate the estimated vector to the next time step, the equation $$\dot{\hat{x}}(t) = f(\hat{x}(t), t)$$

is integrated for the duration of $t_k \leq t \leq t_{k+1}$ and using the initial condition $$\hat{x}(t_k) = \hat{x}(t_k^+)$$

in order to obtain $x(t_{k+1}^-)$.

The error covariance matrix is similarly propagated to the next time step by integrating the equation $$\dot{P}(t) = F(t)P(t) + P(t)F^T(t) + Q(t)$$

for the same duration of $t_k \leq t \leq t_{k+1}$ and using the initial condition $P(t_k^+) = P_k^+$. As mentioned earlier, matrix Q is the covariance matrix of the process noise in the user dynamics model and F(t) is defined as:

$$F(t) := \frac{\partial f(x(t), t)}{\partial x(t)}\bigg|_{x(t) = \hat{x}(t)}, t_k < t < t_{k+1}$$

In addition to the embodiments described above, various additional embodiments are contemplated according to aspects of the present invention.

As described above (for example with reference to FIG. 6), the combined navigation processor may be a component of the mobile device. According to a another embodiment, the combined navigation processor may be a component of an access point (for example the access point 130a of FIG. 1). According to another embodiment, the combined navigation processor may be a component of an assistance server (for example the assistance server 150 of FIG. 1).

Embodiments of the present invention are suitable for power saving environments. For example, when the mobile station 906 includes a Bluetooth® radio and a GPS receiver, if the mobile station 906 is receiving good position information via the Bluetooth® radio, the mobile station 906 may power down its GPS components and compute its position using the position information received via the Bluetooth® radio.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of determining a position of a mobile device using global positioning system (GPS) signals, the method comprising:
receiving, at the mobile device, GPS information from a plurality of GPS satellites;
receiving, at the mobile device, a plurality of GPS differential data from a plurality of access points comprising a first access point and a second access point, the mobile device communicating with the first access point in a first communication protocol and with the second access point in a second different communication protocol, wherein the first communication protocol is for a shorter range communication than the second communication protocol;
computing, at the mobile device, a combined GPS differential data from a weighted average of said plurality of GPS differential data, the weighted average based on communication protocols the mobile device uses to receive GPS differential data from said plurality of access points, wherein GPS differential data received using the first communication protocol that is for the shorter range communication gets a higher weight than GPS differential data received using the second communication protocol;
sending the GPS information received from the plurality of GPS satellites and the combined GPS differential data from the mobile device to an assistance server;
computing, at the assistance server, a distance from the mobile device to each of the plurality of GPS satellites based on the GPS information received from the plurality of GPS satellites;
compensating, at the assistance server, an error in the computed distance from the mobile device to at least one satellite of the plurality of satellites using said combined GPS differential data;
computing, at the assistance server, the position of the mobile device based on said distance from the mobile device to each of the plurality of satellites; and
sending the computed position of the mobile device from the assistance server to the mobile device.

2. The method of claim 1, further comprising sending the position of the mobile device from the assistance server to an emergency service provider.

3. The method of claim 1, further comprising displaying, at the mobile device, the computed position of the mobile device.

4. The method of claim 1, further comprising sending the position of the mobile device from the mobile device to an emergency service provider.

5. The method of claim 1, wherein the first access point communicates with the mobile device through one of a wireless local area network (WLAN), an 802.11x network, a WiMax network, a Bluetooth network, a RFID network, a ZigBee network, and a UWB network, wherein the second access point communicates with the mobile device through a different one of said wireless local area network (WLAN), said 802.11x network, said WiMax network, said Bluetooth network, said RFID network, said ZigBee network, and said UWB network.

6. The method of claim 1, wherein said error is due to multipath interference, wherein the multipath interference is caused by reflections of signals transmitted by satellites on objects near the mobile device and the plurality of access points.

7. The method of claim 1, wherein the GPS differential data is further for reducing errors due to at least one of (i) variations in a speed of radio waves travelling through the earth's atmosphere and (ii) errors due to satellite clock inaccuracies.

8. The method of claim 1 further comprising:
receiving, at the mobile device, the computed position based on the distance from the mobile device to each of the plurality of satellites from the assistance server;
receiving, at the mobile device, a plurality of time of arrival information from said plurality of access points;
computing, at the mobile device, the position of the mobile device using triangulation of said plurality of time of arrival information; and
combining, at the mobile device, the computed position based on the distance from the mobile device to each of the plurality of satellites with the position computed based on the triangulation of the plurality of time of arrival information to compensate for effects of multipath interference.

9. The method of claim 1 further comprising:
receiving, at the mobile device, the computed position based on the distance from the mobile device to each of the plurality of satellites from the assistance server;
receiving, at the mobile device, a plurality of phase information from said plurality of access points;
computing, at the mobile device, the position of the mobile device using triangulation of said plurality of phase information; and
combining, at the mobile device, the computed position based on the distance from the mobile device to each of the plurality of satellites with the position computed based on the triangulation of the plurality of phase information to compensate for effects of multipath interference.

10. The method of claim 1 further comprising:
receiving, at the mobile device, a plurality of assistance data from at least one of said plurality of access points;
computing, at the mobile device, a combined assistance data from said plurality of assistance data; and
sending the combined assistance data from the mobile device to the assistance server,
wherein computing the position of the mobile device further comprises using said combined assistance data.

11. The method of claim 10, wherein computing the position of the mobile device further comprises computing said position based on the GPS information having a first weight and the combined assistance data having a second weight.

12. The method of claim 10, wherein the GPS information includes a final position, velocity, and time solution, wherein computing the position of the mobile device further comprises computing said position based on said final position, velocity and time solution having a first weight and said combined assistance data having a second weight.

13. The method of claim 10, wherein the GPS information includes raw GPS measurements, wherein computing the position of the mobile device further comprises computing said position based on said raw GPS measurements having a first weight and said combined assistance data having a second weight.

14. The method of claim 10, wherein the combined assistance data includes a final position, velocity, and time solution, wherein computing the position of the mobile device further comprises computing said position based on said final position, velocity, and time solution having a first weight and said GPS information having a second weight.

15. The method of claim 10, wherein the combined assistance data includes raw navigation measurements, wherein computing the position of the mobile device further comprises computing said position based on said raw navigation measurements having a first weight and said GPS information having a second weight.

16. The method of claim 10, wherein the combined assistance data includes in-phase and quadrature symbols, wherein computing the position of the mobile device further comprises computing said position based on said in-phase and quadrature symbols having a first weight and said GPS information having a second weight.

17. A system for performing position determination using global positioning system (GPS) signals, the system comprising:
a plurality of access points comprising a first access point and a second access point;
an assistance server; and
a mobile device communicatively coupled to the assistance server, the mobile device comprising:
a GPS receiver configured to receive GPS information from a plurality of GPS satellites;
a wireless communication module, communicatively coupled to said GPS receiver, the wireless communication module configured to receive a plurality of GPS differential data from the plurality of access points, the wireless communication module configured to communicate with the first access point in a first communication protocol and communicate with the second access point in a second different communication protocol, wherein the first communication protocol is for a shorter range communication than the second communication protocol; and
a processor, communicatively coupled to said wireless communication module and said GPS receiver, the processor configured to compute a combined GPS differential data from a weighted average of said plurality of GPS differential data, the weighted average based on communication protocols the mobile device uses to receive GPS differential data from said plurality of access points, wherein GPS differential data received using the first communication protocol that is for the shorter range communication gets a higher weight than GPS differential data received using the second communication protocol;
the wireless communication module further configured to send the GPS information received from the plurality of GPS satellites and the combined GPS differential data from the mobile device to the assistance server;
the assistance server configured to:
compute a distance from the mobile device to each of said plurality of GPS satellites based on the GPS information received from the plurality of GPS satellites;
compensate an error in the computed distance from the mobile device to at least one satellite of the plurality of satellites using said combined GPS differential data;
compute a position of the mobile device based on said distance from the mobile device to each of the plurality of satellites; and
sending the computed position of the mobile device to the mobile device.

18. The system of claim 17, the assistance server further configured to send the position of the mobile device to an emergency service provider.

19. The system of claim 17, the mobile device further configured to display the computed position of the mobile device at the mobile device.

20. The system of claim 17, the mobile device further configured to send the position of the mobile device to an emergency service provider.

21. The system of claim 17, wherein the first access point communicates with the mobile device through one of a wireless local area network (WLAN), an 802.11x network, a WiMax network, a Bluetooth network, a RFID network, a ZigBee network, and a UWB network, wherein the second access point communicates with the mobile device through a different one of said wireless local area network (WLAN), said 802.11x network, said WiMax network, said Bluetooth network, said RFID network, said ZigBee network, and said UWB network.

22. The system of claim 17, wherein said error is due to multipath interference, wherein the multipath interference is caused by reflections of signals transmitted by satellites on objects near the mobile device and the plurality of access points.

23. The system of claim 17, wherein the GPS differential data is further for reducing errors due to at least one of (i) variations in a speed of radio waves travelling through the earth's atmosphere and (ii) errors due to satellite clock inaccuracies.

24. The system of claim 17, the mobile device further configured to:
receive the computed position based on the distance from the mobile device to each of the plurality of satellites from the assistance server;
receive a plurality of time of arrival information from said plurality of access points;
compute the position of the mobile device using triangulation of said plurality of time of arrival information; and
combine the computed position based on the distance from the mobile device to each of the plurality of satellites with the position computed based on the triangulation of the plurality of time of arrival information to compensate for effects of multipath interference.

25. The system of claim 17, the mobile device further configured to:
receive the computed position based on the distance from the mobile device to each of the plurality of satellites from the assistance server;
receive a plurality of phase information from said plurality of access points;
compute the position of the mobile device using triangulation of said plurality of phase information; and
combine the computed position based on the distance from the mobile device to each of the plurality of satellites with the position computed based on the triangulation of the plurality of phase information to compensate for effects of multipath interference.

26. The system of claim 17, the mobile device further configured to:
receive a plurality of assistance data from at least one of said plurality of access points;
compute a combined assistance data from said plurality of assistance data; and
send the combined assistance data from the mobile device to the assistance server,
wherein computing the position of the mobile device further comprises using said combined assistance data.

27. The system of claim 26, wherein computing the position of the mobile device further comprises computing said position based on the GPS information having a first weight and the combined assistance data having a second weight.

28. The system of claim 26, wherein the GPS information includes a final position, velocity, and time solution, wherein computing the position of the mobile device further comprises computing said position based on said final position, velocity and time solution having a first weight and said combined assistance data having a second weight.

29. The system of claim 26, wherein the GPS information includes raw GPS measurements, wherein computing the position of the mobile device further comprises computing said position based on said raw GPS measurements having a first weight and said combined assistance data having a second weight.

30. The system of claim 26, wherein the combined assistance data includes a final position, velocity, and time solution, wherein computing the position of the mobile device further comprises computing said position based on said final position, velocity, and time solution having a first weight and said GPS information having a second weight.

31. The system of claim 26, wherein the combined assistance data includes raw navigation measurements, wherein computing the position of the mobile device further comprises computing said position based on said raw navigation measurements having a first weight and said GPS information having a second weight.

32. The system of claim 26, wherein the combined assistance data includes in-phase and quadrature symbols, wherein computing the position of the mobile device further comprises computing said position based on said in-phase and quadrature symbols having a first weight and said GPS information having a second weight.

* * * * *